United States Patent [19]

De Busscher et al.

[11] 4,344,443
[45] Aug. 17, 1982

[54] CLEANING APPARATUS OF COMBINE HARVESTERS

[75] Inventors: Cyriel R. J. De Busscher, Sijsele-Damme; Walter V. Deleu, Torhout; Francois Van Herpe, Houtem, all of Belgium

[73] Assignee: Sperry Corporation, New Holland, Pa.

[21] Appl. No.: 165,161

[22] Filed: Jul. 1, 1980

[30] Foreign Application Priority Data

Jul. 4, 1979 [GB] United Kingdom ................ 7923326

[51] Int. Cl.³ ............................................. A01F 12/24
[52] U.S. Cl. ................................ 130/272; 130/27 AE
[58] Field of Search .............. 130/27 R, 27 S, 27 AE, 130/27 Z

[56] References Cited

U.S. PATENT DOCUMENTS 2,293,328  8/1942  Coburn ........................ 130/27 AE
2,739,597  3/1956  Buttari ........................... 130/27 AE
2,750,037  6/1956  Taylor ........................... 130/27 AE
3,456,652  7/1969  Louks et al. .................. 130/27 AE
4,007,744  2/1977  Shaver .......................... 130/27 Q

FOREIGN PATENT DOCUMENTS

2015701  10/1971  Fed. Rep. of Germany .... 130/27 Z

*Primary Examiner*—Robert A. Hafer
*Attorney, Agent, or Firm*—James R. Bell; Frank A. Seemar

[57] ABSTRACT

A combine harvester with a threshing, separating and cleaning device, the cleaning device comprising a grain pan (6), at least one cleaning sieve (7, 8) and a cleaning fan (9) operatively positioned relative to each other and pivotable in unison about a generally fore-and-aft extending axis (53) so that, when the combine harvester is transversely inclined relative to the horizontal, the cleaning device may be leveled to a transverse generally horizontal position.

10 Claims, 10 Drawing Figures

CLEANING APPARATUS OF COMBINE HARVESTERS

BACKGROUND OF THE INVENTION

The present invention relates to combine harvesters and more particularly to improvements in the cleaning apparatus of combine harvesters which improve substantially the crop cleaning characteristics thereof, epecially when the machines are operating on terrain that is inclined from the horizontal. Although the invention is useful on all known types of combines, it is particularly beneficial when provided on axial flow type combines which do not utilize the well known conventional straw walkers.

Conventional combine harvesters have as part of the grain cleaning mechanism a so-called grain pan which is disposed below the threshing and separating mechanism for collecting grain kernels, chaff and tailings (un-threshed heads) separated from the straw in said threshing and separating mechanism. The grain pan is arranged to supply material collected thereon to cleaning sieves which are reciprocated in a fore-and-aft direction in the path of a rearwardly and upwardly directed cleaning air blast from a cleaning fan disposed below the grain pan and below and forwardly of the cleaning sieves to separate the kernels from the chaff and the tailings. The small, relatively heavy kernels pass through the sieves and are collected therebeneath. The light chaff is blown out of the rear end of the cleaning mechanism and the tailings, being too large to pass through the sieves are too heavy to be blown with the chaff, drop from the rear edges of the sieves and are collected for rethreshing.

Axial flow type of combine harvesters use a grain pan of some type underlying the threshing and separating mechanism, typically one or two rotors, in conjunction with cleaning sieves which usually are reciprocatable. A cleaning fan blows upwardly from below the grain pan thru the sieves. Variations in axial flow cleaning systems have employed transfer or distribution augers and accelerator rolls in attempts to solve the problems created by operating combine harvesters on inclined terrain.

It is obvious that the efficiency of a cleaning system in a combine is greater if the crop material is continuously fed to the sieves and the cleaning air blast from the cleaning fan is uninterrupted. As a rule this is achieved only if the combine harvester is in a virtually horizontal position. Where the ground is irregular, particularly on slopes, different things can happen in the cleaning mechanism, dependent upon a number of factors, such as the degree to which the combine is inclined from the horizontal. If the combine is operating downhill crop material may pile up on the grain pan and/or on the lower points of sieves. This situation can prevent the crop material from being cleaned properly and clogging may occur within the cleaning mechanism. On the other hand, if the combine is operating uphill, crop material can pass too rapidly over the sieves and grain will be spilled over the rear edges of the sieves, instead of passing through them. This will result in unacceptable grain losses.

When the combine harvester is working inclined relative to the horizontal and inclined transversely in relation to the direction of travel, crop material separated from the straw in the threshing and separating means tends to move to the lower side of the grain pan. This sideward shifting of crop material is continued during its transport along the grain pan, during its transfer from the grain pan to the cleaning sieves, during its movement across the cleaning sieves and during its dropping from one sieve to another sieve disposed therebelow. The result of all this is that the higher or uphill sides of the sieves are virtually free of crop material while the lower sides of the sieves are so heavily loaded with crop material that clogging may occur. This, in turn, results in grain emerging from the combine harvester at the rear instead of passing through the sieves to the clean grain trough for transport to the grain tank. This situation results in considerable grain losses at the lower or downhill side of the sieves. Also, with uneven loading of the sieves the cleaning air blast is unequally effective, so that the effect of cleaning is further considerably diminished. Indeed, cleaning air tends to escape through the underloaded sieve sections, thus leaving the overloaded sieve sections with reduced air blasts.

A great many devices have been utilized in the past to take care of these conditions. However, none of them have been fully satisfying in all respects.

When operating up and down the incline, the loading of the sieves remains substantially equal in the transverse direction. As previously described, either the accumulation of crop material at a forward end of the sieves or the too fast movement of crop material over the sieves towards the rear will result in excessive grain losses and substantially reduced efficiency of the harvester. These problems can be fairly easily overcome either by increasing the air blast, particularly at the forward ends of the sieves, when operating downhill or by reducing the air blast when operating uphill. These corrective measures are accomplished by either appropriately increasing or decreasing the cleaning fan speed. In order to permit such adjustments to be accomplished while the combine is operating, the fan speed is made adjustable from the operator's platform.

The problems are substantially more difficult when the combine harvester is operated on inclines which are transverse to the direction of travel under conditions when uneven sieve loading in a transverse direction is experienced.

One approach which has been taken to solve the aforementioned problems, tilts the entire combine body in one or other direction with respect to the wheels and the header to keep the cleaning means level. This approach has been found to be very effective in many cases. However, it is a very complicated and expensive approach.

Other prior art approaches have kept sections of the cleaning sieves, or the entire cleaning sieves, as well as the entire cleaning shoe, level. These approaches in conventional combine harvesters using straw walkers generally employ means for counterbalancing the sieves, cleaning shoe or sieve sections about fore-and-aft extending axes to provide instantaneous reaction to the tilting of the combine harvester transversely to the direction of travel. While the concept of counterbalancing about fore-and-aft axes is sound, the known devices to carry out this concept are not wholly satisfactory for one reason or another. As mentioned before, it is not only necessary to maintain the sieves level in transverse direction, but it is equally important that the air blast therethrough be maintained uniformly in the transverse direction at all times. The leveling devices suggested in the past have either ignored this problem completely, or have attempted to solve it by providing adjustable air deflecting means in the air stream which react to the leveling action of the counterbalancing to alter the direction of the air stream. Such an alteration of the air stream does have a beneficial result, but still does not wholly solve the problem, since deflecting the air with wind boards situated in the air stream, the volume and velocity of the air is altered, as well as the direction. This change in volume and velocity is not desirable.

Also, the layer of crop material supplied to the cleaning sieves should be kept substantially of even thickness transversely across the cleaning sieves. In certain proposed solutions adjustable crop deflecting means are arranged on the grain pan which react to the transverse inclination of the machine to direct crop material towards the higher side of the cleaning sieves.

In still another approach, it has been proposed to let both the cleaning sieves and the cleaning fan level in unison so that at all times the same relationship exists between the cleaning fan and the cleaning sieves. In one such arrangement the cleaning shoe together with the cleaning fan housing are pivotally mounted around the fan axis. The leveling device provided in this arrangement causes the cleaning shoe to remain substantially level in fore-and-aft direction only and thus the more critical transverse leveling is not accomplished. Also, as stated previously, the necessity for leveling the cleaning device lengthwise of the machine can be avoided in a fairly inexpensive way by making the fan speed adjustable from the operator's platform.

In still another approach, the cleaning shoe and the cleaning fan are mounted for transverse leveling in unison as the machine is tilted transversely to the horizontal during operation. In this known arrangement the relationship between the cleaning fan and the cleaning sieves remains unvaried. However, certain problems still occur in as far as the problems associated with the grain pan on the one hand and the transfer from the grain pan to the sieves on the other hand are not yet solved. Also, the transfer of the clean grain and the tailings from the cleaning mechanism to the remainder of the machine causes problems because the transfer area movement of grain and tailings may not be continuous or crop losses may occur.

The aforementioned problems are solved in the design of the cleaning system of the present invention for both conventional combines using a transverse threshing cylinder and straw walkers or the more recent axial flow type of combines by providing in a combine harvester a cleaning device with a cleaning efficiency which remains continuously high even when operating on uneven ground.

SUMMARY OF THE INVENTION

It is a principal object of the present invention to provide in a combine harvester a cleaning apparatus having a grain pan, at least one cleaning sieve and a cleaning fan operatively disposed relative to each other and pivotable in unison about a generally fore-and-aft extending axis so that when the combine is transversely inclined relative to the horizontal, the cleaning device may be pivotably levelled to a generally horizontal position.

These and other objects, features and advantages are obtained by providing in a combine harvester a cleaning system for both conventional combines using a transverse threshing cylinder and straw walkers or axial flow type of combines with a cleaning efficiency which remains continuously high even when operating on uneven ground.

BRIEF DESCRIPTION OF THE DRAWINGS

The features and advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

The terms "forward," "rearward," "left," "right," etc. when cited in connection with the combine harvester and/or components thereof are determined with reference to the forward operative travel of the combine harvester in the field.

With reference to the FIGS. 1 to 10 a combine harvester of the conventional type comprising straw walkers and embodying the present invention will now be described in greater detail. While not shown, the invention is equally applicable on the axial flow type of combines and, as a matter of fact, it is even more beneficial on such combines. This is because cleaning thereon is more critical since the threshing and separating capacity is greater and under certain conditions straw breakage can be greater. While a specific embodiment of the present invention will now be described by way of example, it should be understood that this is not intended to limit the invention to the exact construction as shown and described.

Figure 1:
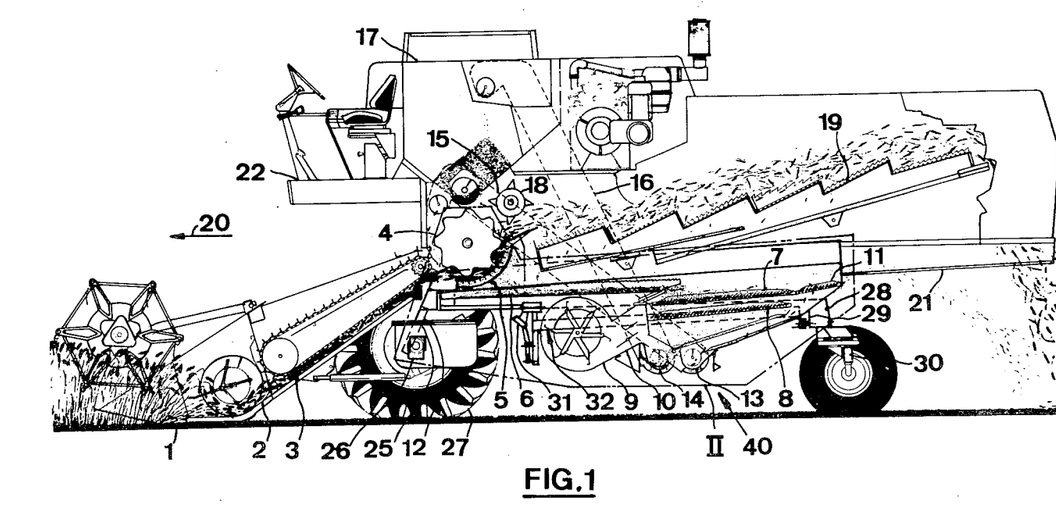
FIG. 1 is a schematic elevational view lengthwise of a combine harvester embodying the present invention and illustrating the major components of the machine.

FIG. 1 shows a side-elevation of the combine harvester comprising a cutterbar 1, a header 2, a crop elevator 3 and a threshing mechanism to which the elevator feeds cut crop, the threshing mechansim having a cylinder 4 and a concave 5. Beneath the threshing mechanism there is located a cleaning mechanism comprising a grain pan 6, an upper chaffer sieve 7, a lower sieve 8 and a fan 9 provided with an outlet duct 10 operable to direct the stream of air issuing from the fan 9 along and across the sieves 7 and 8.

The usual tailings trough 13 and clean grain trough 14 are positioned below the sieves 7 and 8 with respective augers therein and connected by associated conveyors 15 and 16 to the threshing mechanism and a grain tank 17, respectively.

A beater 18 is operable on the threshed crop material issuing from the threshing mechanism to assist the passage thereof to conventional straw walkers 19 which separate any grain remaining in the crop material, which grain falls through the straw walker surfaces and is directed to the grain pan 6. The straw issuing from the straw walkers 19 is discharged to the ground through a rear discharge opening 21, as is chaff, dust, etc. blown from the sieve 7. An operator's platform 22 is located immediately in front of the grain tank 17, above the crop elevator.

Both of the sieves 7 and 8 are inclined slightly upwardly from front to rear of the machine, the direction of forward, operative travel of the machine being indicated in FIG. 1 by arrow 20. Furthermore, the rear section 11 of the chaffer sieve 7 is inclined at a steeper inclination and extends beyond the rear edge of the lower sieve 8. Also, both the sieves 7 and 8 together with the grain pan 6 are in use reciprocated from front to rear in order to move crop material received thereon from the grain pan 6 gradually rearwardly of the machine, clean grain continually falling through the sieves to the clean grain trough 14 in the process. The "mesh" of each of the sieves 7 and 8 may by provided by a plurality of transverse louvres each stamped out of sheet metal and having a main body portion rearwardly extending fingers and a forwardly exteding portion which is angled downwardly with respect to the main body portion. The louvres are juxtaposed such that the fingers of one overlie the body portion and rear portion of the next louvre, hence forming a "mesh" through which clean grain may fall.

The "mesh" of the sieves 7 and 8 and of the sieve extension may be adjustable independent from each other so as to adapt it to the crop which is harvested. Also, the "mesh" of the sieve extension 11 may be adjusted wider than the "mesh" of the chaffer sieve 7 and lower sieve 8 so as to separate tailings therethrough.

With reference to FIGS. 2 to 10 the cleaning mechanism according to the present invention, its drive arrangement, its suspension on the combine chassis and its operation will now be described in greater detail. The combine harvester chassis 12 comprises fore-and-aft extending side beams 23 having curved inner surfaces 24 and which are attached at their forward ends to downwardly projecting legs 25 which themselves are coupled at their lower ends to a main transverse beam 26 supporting at its opposite ends the traction wheels 27. Downwardly projecting legs 28 are equally attached to the rear ends of the side beams 23 and are connected together at their lower ends via a transverse beam 29 pivotally supporting at its middle point the steering wheel axle 30.

Figure 2:
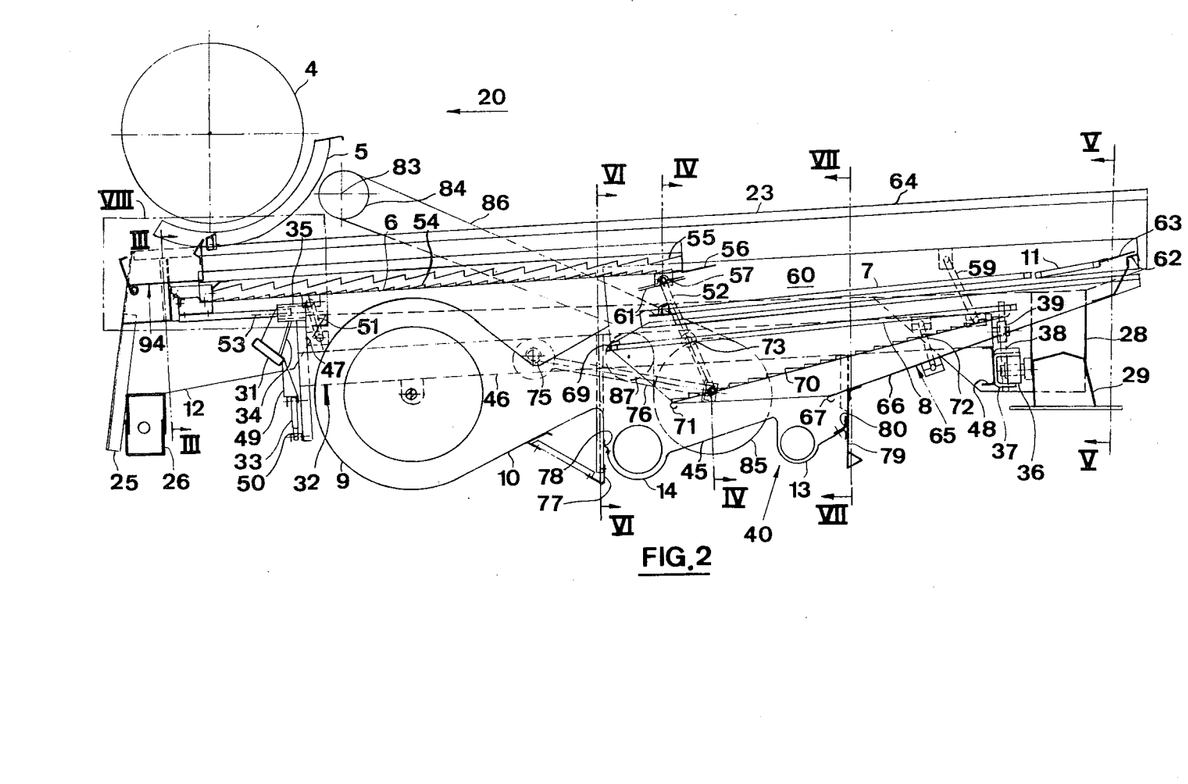
FIG. 2 shows the portion of the machine indicated at II in FIG. 1 on a larger scale.
Figure 3:
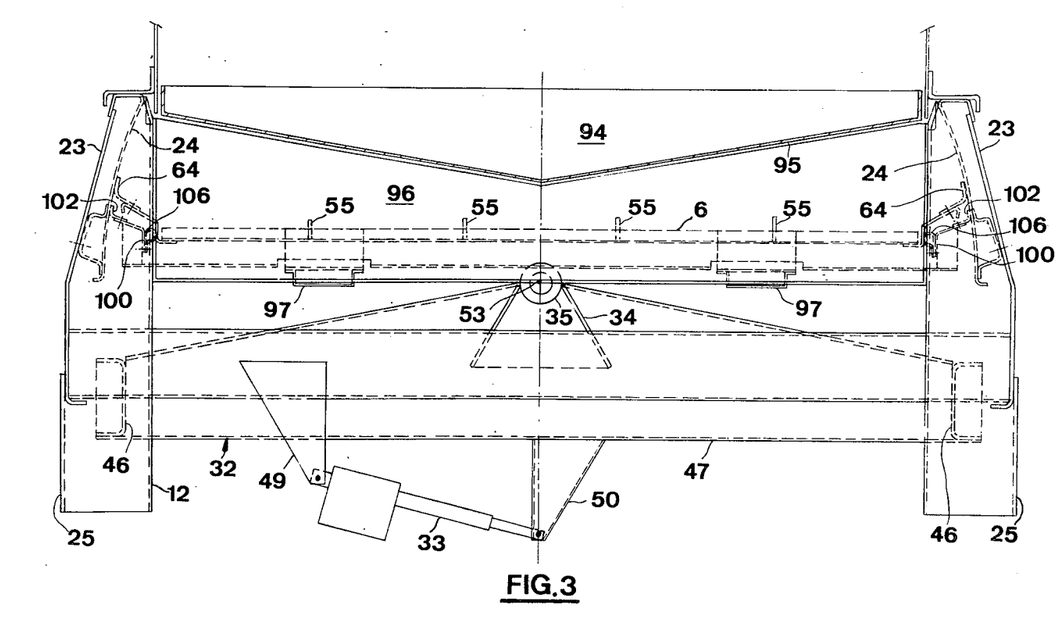
FIGS. 3 to 7 are partial sectional views taken along the lines III—III to VII—VII in FIG. 2.
Figure 4:
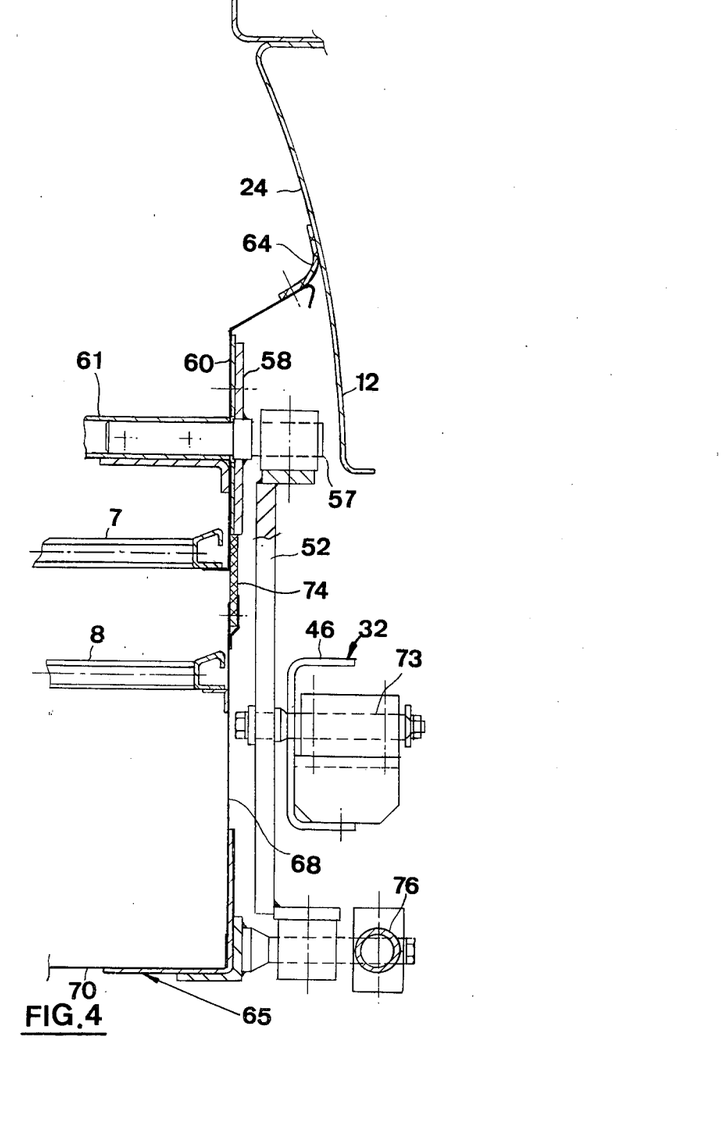
Figure 5:
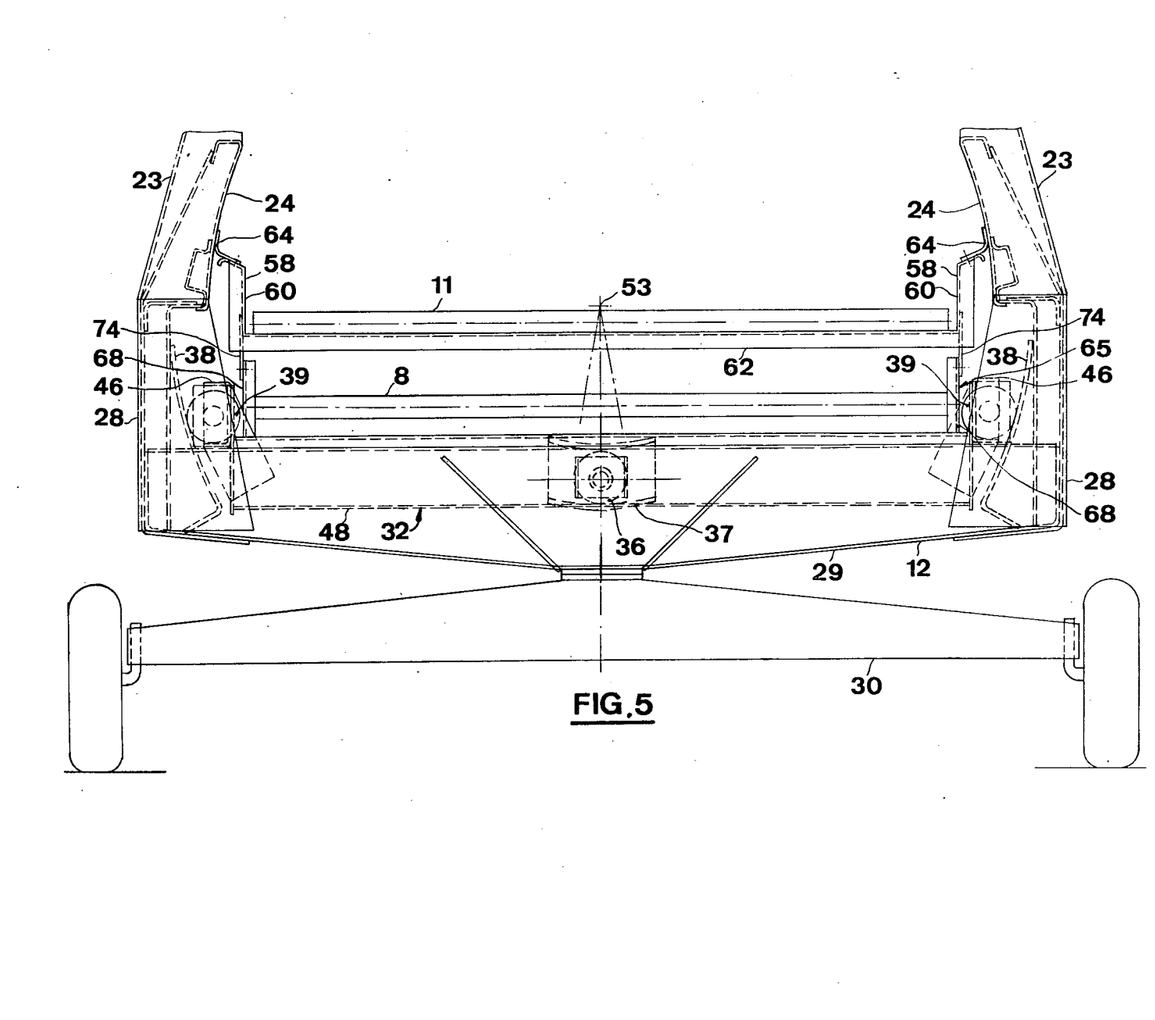
Figure 6:
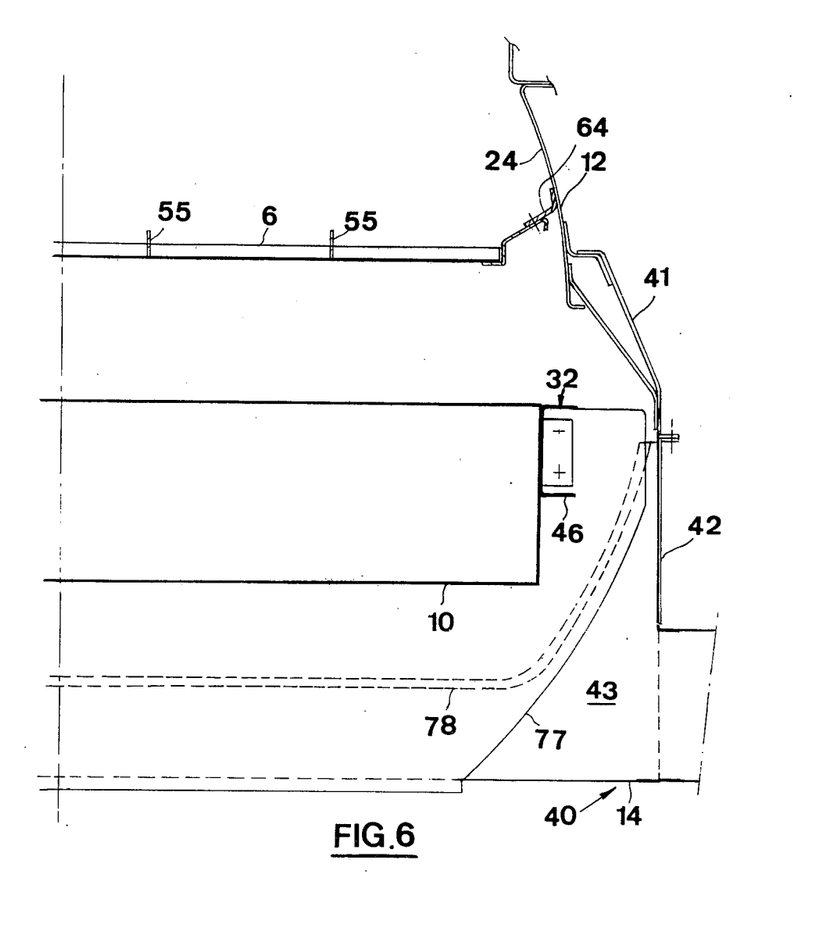
Figure 7:
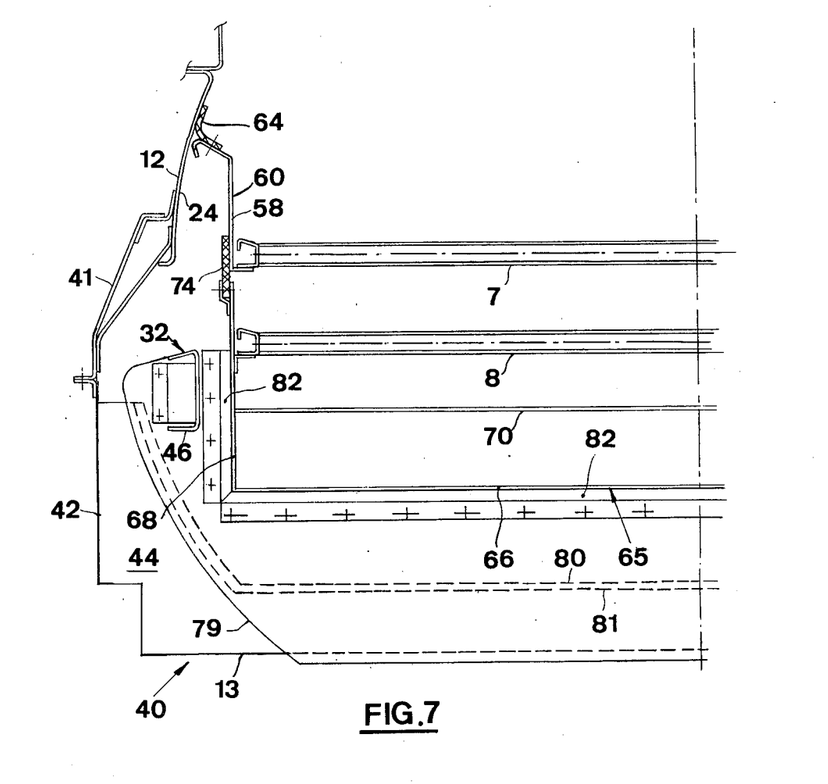

A further transverse beam 31 extends between the side beams 23 at the location just forwardly of the cleaning fan 9 and acts as a support for a subframe 32 and an actuator 33 to be described in further details hereafter. A central mounting bracket 34 projects upwardly from this further transverse beam 31 and comprises at its free end a fore-and-aft extending bearing bushing 35 which is positioned closely adjacent the underside of the grain pan 6. This bearing bushing is further also positioned in the center of curvature of both arcuate surfaces 24 of the side beam 23. The rear transverse beam 29 supports generally at its middle point and substantially below the level of the aforementioned bearing bushings 35 a forwardly projecting stubshaft with a support roller 36 rotatably mounted thereon. This support roller 36 is arranged to carry the rear end of said subframe 32 via a guide channel section 37 of arcuate shape mounted on said subframe 32. Further arcuate guide members 38 are mounted at opposite sides of the support roller 36 on the rear downwardly extending legs 28 and are cooperable with further guide rollers 39 rotatably mounted on said subframe 32. The arcuate guide members 38 on the chassis 12 and the guide channel section 37 on the subframe 32 when the latter is installed in the machine, all have the same center of curvature which is aligned with the bearing bushing 35. Said guide channel section 37 and said guide members 38 are positioned below respectively at both sides of the discharge end of the cleaning shoe so as to avoid interference with chaff being discharged from said cleaning shoe during operation on the one hand and so as to permit interchanging sieves in the cleaning shoe from the rear on the other hand.

Intermediate the opposite ends of the side beams 23 an auger casing 40 is rigidly mounted to the chassis 12 via a pair of downwardly and outwardly extending supporting members 41 and thus the auger casing remains stationary relative to the combine chasis 12 during operation. The auger casing 40 comprises opposite side walls 42, front and rear walls 43, respectively 44 and the aforementioned clean grain auger trough 14 and the tailings auger trough 13 together forming in part the bottom wall 45 of said casing.

Pivotally mounted on the chassis 12 above the level of the auger troughs 13, 14 is the subframe 32 mentioned above. This subframe 32 comprises a pair of opposite side beams 46 which extend generally fore-and-aft below the level of the side beams 23 of the chassis 12 and which at their forward end are coupled to each other via a transverse beam 47. Attached to the undersides of said side beams 46 at the rear ends thereof is a further transverse beam 48, so that, as seen in top view, the subframe is generally rectangular in shape.

The subframe 32 is pivotally supported at its forward end on the chassis 12 via the bearing bushing 35 and at its rear end via the support roller 36 and associated guide channel section 37. The support roller 36 takes up the weight of the subframe 32 and everything which is mounted thereon while that the guide rollers 39 and associated guide members keep the subframe centered within the chassis.

The actuator 33 extends between a bracket 49 on the further transverse beam 31 of the chassis 12 on the one hand and a downwardly projecting bracket 50 on the forward transverse beam 47 of the subframe 32 on the other hand and is operable to pivot the subframe relative to the chassis about the axis of the bearing bushing 35.

Reciprocatingly mounted on the subframe 32 is a number of components, the first one of which is the grain pan 6. The grain pan 6 is mounted on the subframe 32 via a pair of front rocking links 51 and a pair of rear rocking links 52 and extends at the level substantially above said subframe 32 and substantially at the level of the pivot axis of 53 of said subframe 32. The grain pan 6 is quite conventional in shape and comprises a corrugated floor 54 wherein the corrugations extend transversely of the machine and have smoothly upwardly inclined leading surfaces and steeply downwardly inclined rear surfaces as seen in the direction from front to rear of the machine. Divider strips 55 extend longitudinally of the grain pan 6 and a rake assembly 56 extends rearwardly of the discharge end of the grain pan 6.

Rearwardly of the grain pan 6 and pivotally attached thereto at 57 is a rectangular frame 58 which at its rear end is reciprocatingly mounted on the subframe via rocking links 59. The grain pan 6 and the frame 58 are thus reciprocated during operation in unison and can pivot slightly relative to each other at 57. Together they form the so-called upper shaker shoe. The rectangular frame 58 comprises a pair of opposite fore-and-aft extending side walls 60 having their upper edges generally aligned with the upper side edges of the grain pan 6. The rectangular frame 58 further also comprises a pair of front transverse beams 61 which are spaced the one above the other and which are shaped so as to act as air deflector and guide members operable to direct a jet of air from below and the front onto the underside of the rake assembly 56. To this end the transverse beams are disposed underneath and slightly forwardly of said rake assembly 56. The lower one of said pair of beams 61 is further also arranged to receive and support the forward edge of the chaffer sieve 7. The rectangular frame 58 finally also comprises a rear transverse beam 62 which when the chaffer sieve 7 and the sieve extension 11 are installed, is disposed substantially below the rear end of the rake assembly 63 which is part of said sieve extension 11.

Sealing strips 64 are attached to the upper edges of both sides of as well the grain pan 6 as the rectangular frame 58 and extend in sealing engagement with the curved inner walls 24 of the side beams 23 while permitting both oscillating and pivoting motion of said grain pan 6 and said rectangular frame 58 relative to the chassis 12. The frame 58 is arranged so that it can support the chaffer sieve 7 with its forward edge at a distance below and just forwardly of the discharge end of the grain pan 6. By so doing crop material drops from the grain pan 6 onto the chaffer sieve 7 and a cleaning air blast is directed onto the crop material as it is dropping from said grain pan 6.

Between the crop elevator 3 and the concave 5 a stone trap 94 is provided which, apart from its shape is quite conventional. Rather than having a flat bottom wall transversely of the combine harvester, its bottom wall 95 is inclined upwardly from the center thereof to the opposite sides so as to provide room for the grain pan 6 to be angularly adjusted therebelow about the pivot axis 53. A vertical wall 96 which is part of the chassis extends downwardly from said bottom wall 95.

The subframe 32 carries a pair of forwardly projecting arms 97 which extend below the forward end of the grain pan 6 and which carry a generally U-shaped structure 98 which is pivotal in unison with the subframe 32 and which comprises a transverse front wall 99 and opposite side walls 100 to which are attached sealing strips 101–102 respectively for sealingly engaging with respectively the vertical wall 96 of the chassis and the curved surfaces 24 of the chassis and which permit angular adjustment of the U-shaped structure 98 relative to said chassis.

The forward end 103 of the grain pan 6 is disposed between the side walls 100 of the U-shaped structure 98 and a flexible sealing member 104 bridges the gap between said forward end 103 and said transverse wall 99. As described above, sealing strips 64 are attached to the side edges of the grain pan 6 which sealingly engage with the curved surfaces 24 of the chassis. These sealing strips 64 overlie the sealing strips 102 of the U-shaped structure 98 at their forward ends. Between these overlying sealing strips 64–102 openings still may be left when seen in front view. These openings are sealed by sealing strips 105 attached to the side walls 100 of the U-shaped structure and which sealingly engage with the underside of the side edges of the grain pan 6.

Finally, as seen in top view, openings also may be left between the forward ends of the sides of the grain pan 6 on the one hand and the walls 100 of the U-shaped structure 98 on the other hand. These openings may be filled up completely by sealing loops 106 attached to the side walls 100 and engaging the grain pan sides. All the above described sealing members 64, 104, 105 and 106 still permit oscillatory movement of the grain pan relative to the U-shaped structure on the one hand and prevent crop losses at the forward end of the grain pan on the other hand.

Underneath the rectangular frame 58 is disposed a lower shake shoe 65 which basically is composed of a downwardly and forwardly inclined bottom wall 66 which has its forward edge 67 above the tailings auger trough 13, a pair of opposite side walls 68 and a front transverse beam 69. The lower shaker shoe 65 is further adapted to receive the lower sieve 8 at a location substantially below the chaffer sieve 7 and in a manner so that the lower sieve 8 has its rear edge forwardly of and below the sieve extension 11. The lower shaker shoe 65 further also comprises an additional forwardly inclined floor 70 which extends between the side walls 68 at a distance above the bottom wall 66 so as to permit the passage therebetween of tailings. The additional floor 70 has its forward edge 71 substantially above the clean grain auger trough 14 so as to direct clean grain collected on said floor as it is separated through said lower sieve 8 to said auger trough 14.

The lower shaker shoe 65 is reciprocatingly coupled to the subframe 32 via a pair of rear rocking links 72 and the lower ends of the rocking links 52 which equally support the grain pan 6 and the frame 58. The pivotal mounting 73 of the rocking links 52 on the subframe 32 is disposed between the pivotal attachments to respectively the upper and lower shaker shoes so that in operation said upper and lower shaker shoes are oscillated in opposite directions. The side walls 68 of the lower shaker shoe 65 carry sealing strips 74 at their upper edges which are in sealing engagement with the rectangular frame 58 of the upper shaker shoe on the one hand and which permit both of said shaker shoes to oscillate relative to each other.

Oscillatory movement is imparted to said shaker shoes in a conventional manner via an intermediate shaft 75 rotatably mounted on the subframe 32, and conrods 76 excentrically and rotatably coupled at one end to said intermediate shaft 75 and at their opposite ends to the lower ends of the rocking links 52.

The subframe 32 further also carries a fan 9 with a fan outlet 10 facing rearwardly and upwardly at a location forwardly of the sieves 7 and 8. The fan outlet 10 is positioned relative to the sieves 7 and 8 and relative to the grain pan 6 so that during operation an air blast is directed through both sieves from the underside thereof on the one hand and that on the other hand also a cleaning air blast is directed through the crop transfer areas from the grain pan 6 to the chaffer sieve 7, from the chaffer sieve 7 to the lower sieve 8 and finally from the lower sieve 8 to the clean grain collecting floor 70 in a direction which is almost perpendicular to the direction of movement of crop material in said transfer areas.

As described, upper sealing means 64 are provided between the upper edges of the pivotally mounted cleaning means and the machine framework, permitting on the one hand pivotal motion of the cleaning means relative to the machine framework and ensuring on the other hand that all threshed and separated material is directed to the cleaning means without the risks for any losses to occur. Further sealing means between the cleaning means and the clean grain and tailings auger troughs 13, 14 will now be described in more details.

Figure 8:
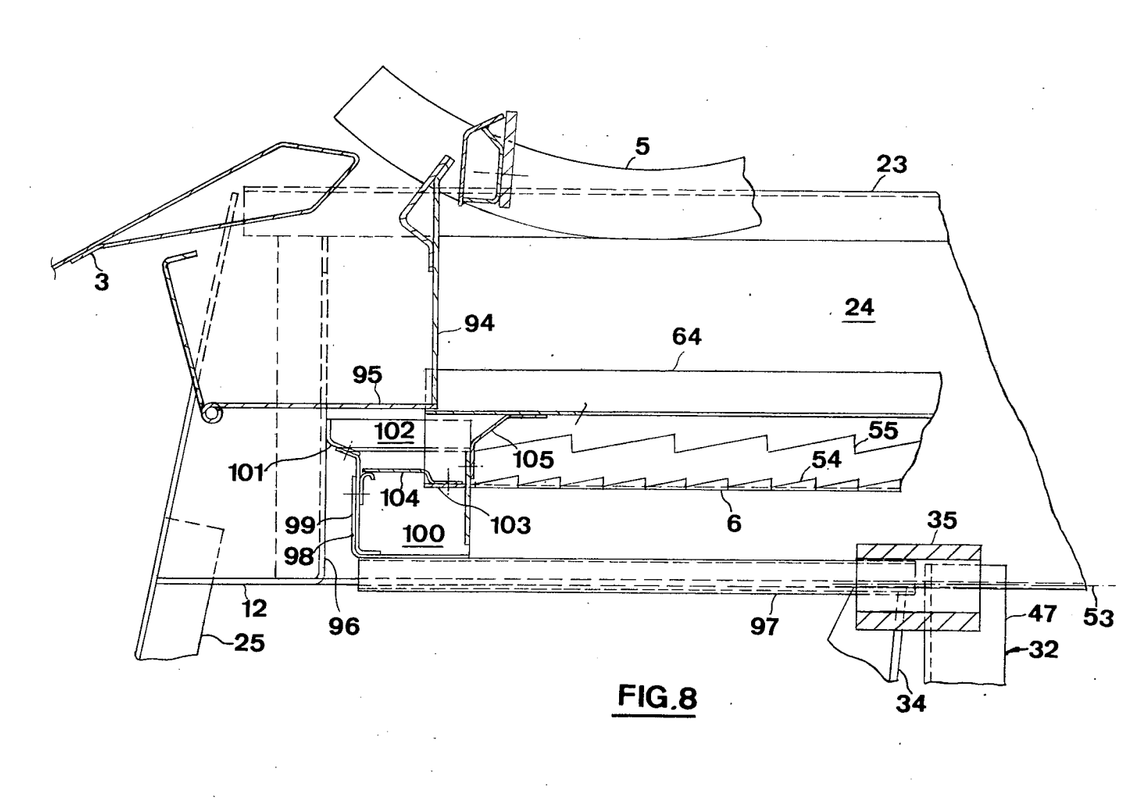
FIG. 8 shows the portion indicated at VIII in FIG. 2 on a larger scale.

A sealing plate 77 is attached to the fan outlet 10 and extends therebelow as well as to both sides thereof and is movable in unison therewith. The fan outlet 10 reaches to within the auger casing 40 and to this end an opening is provided in the front wall 43 thereof. This opening is substantially larger than the size of the fan outlet 10 at the location of said opening so as to permit pivotal motion of said fan outlet about the pivot axis 53 and relative to the auger casing 40. Sealing strips 78 are attached to the edges of said opening and lie in sealing contact with the sealing plate 77 in a manner permitting pivotal movement of the sealing plate 77 relative to the auger casing 40.

A similar sealing arrangement is associated with the rear wall 44 of the auger casing 40 and comprises a sealing plate 79 attached to the longitudinal beams of the subframe 32. Sealing strips 80 secured to the edges of an opening 81 in the rear wall 44 of said auger case 40 sealingly engage with said sealing plate 79. Again said opening 81 is sufficiently large to permit pivotal motion of the cleaning device about the pivot axis 53 without the risks for the lower shaker shoe 65 to interfere with said rear wall 44 of the auger casing 40. It will also be understood that the sealing plates 77 and 79 and the front and rear walls 43 and 44 of the auger casing 40 are oriented perpendicular to the pivot axis 53 so as to maintain sealing contact therebetween. Also, it is clear that the auger casing 40 in fact encloses the angularly adjustably mounted cleaning device. Furthermore, as the lower shaker shoe 65 oscillates relative to the subframe 32 during operation, further sealing strips 82 are provided on said sealing plate 79 which sealingly engage the underside and the sidewalls of the lower shaker shoe 65.

Figure 9:
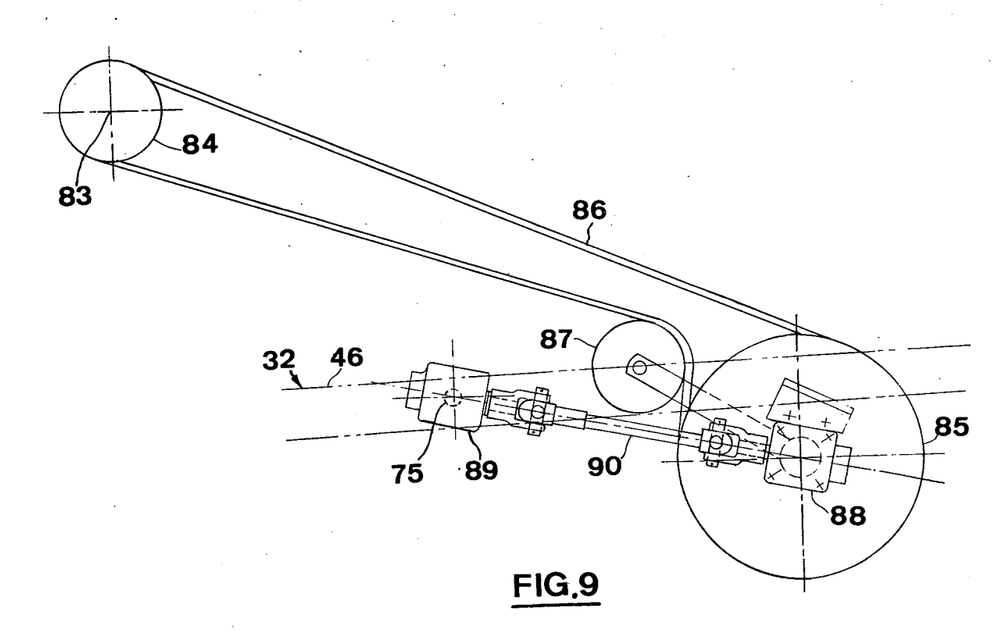
FIG. 9 schematically shows the drive means of the cleaning device according to the invention and FIG. 10 shows an electrical diagram for controlling the angular position of the cleaning device according to the invention.

Motive power is supplied to the intermediate shaft 75 on the subassembly 32 from an intermediate shaft 83 on the machine chassis 12 via a drive transmission comprising the followng components: a belt drive with pulleys 84 and 85, belt 86 and tension pulley 87, a first gearbox 88 coaxially with the pulley 85 and mounted on the machine chassis 12, a further gearbox 89 mounted on the subassembly 32 and arranged to drive the intermediate shaft 75 and a telescoping universal joint shaft 90 extending between both of said gearboxes. As described above, oscillatory movement of the grain pan 6, and the cleaning sieves 7 and 8 is obtained from said intermediate shaft via excentrics on said shaft and conrods 76 extending between said shaft and the rocking links 52. The fan rotor is driven in a conventional manner from said intermediate shaft 75 via a belt variator (not shown).

Figure 10:
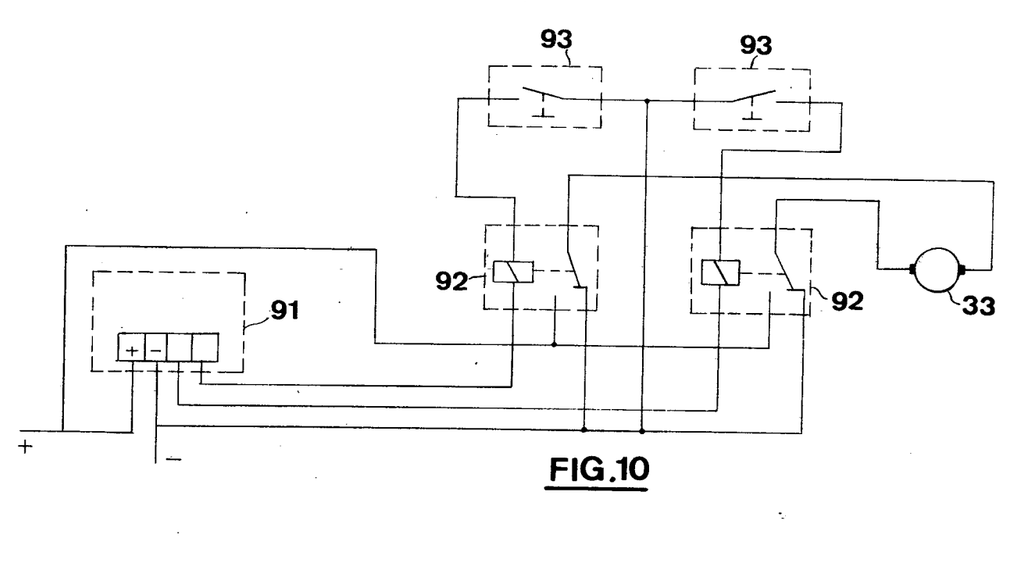

The actuator 33 is included in an electric circuitry also comprising an inclination detector 91, a pair of relays 92 and a pair of limit switches 93. The inclination detector 91 may be of any known type and is mounted on the subframe 32 and is operable to produce a signal when the subframe assumes a position at an angle relative to the horizontal. Dependent on the direction of the inclination, said signal is fed to the one or other relay 92 and actuation of the one or other relay 92 results in the energization of the actuator 33 in the one or other direction. Thereby the cleaning device is angularly adjusted and as it reaches the horizontal position, energization of the actuator 33 is stopped. The limit switches 93 prevent further energization of the actuator 33 as the subframe reaches its maximum angular adjustment in the one or other direction.

In operation all machine components are driven and the machine is moved across a field of standing crop. Crop is cut and fed to the threshing and separating means where it is threshed and grain is separated from the straw which is discharged rearwardly of the machine. Threshed and separated grain with impurities and tailings drop onto the grain pan 6. The oscillatory movement of the grain pan 6 causes the heavier grain kernels to position in the lower part of the layer of crop material and the lighter chaff and short straw particles are moved to the top of said layer. Also, crop material is evenly spread over the full width of the grain pan 6. Finally, due to the oscillatory movement of the grain pan 6 on the one hand and due to the corrugated grain pan floor 54 on the other hand, material thereon is gradually moved to the rear of the grain pan, where it drops from said grain pan through a first cleaning air blast onto the chaffer sieve 7. This cleaning air blast already separates a certain proportion of impurities such as chaff, short straw and dust from the grain and discharge it rearwardly of the machine.

Oscillatory movement of the chaffer sieve 7 equally moves crop material received thereon gradually rearwardly of the machine, while that grain is continuously falling through the chaffer sieve onto the lower sieve 8. The same operation is repeated by the lower sieve 8 and thus material is moved gradually rearwardly thereon while that clean grain is continuously falling therethrough onto the clean grain collecting floor 70.

As material falls through both sieves 7 and 8, as it falls from the chaffer sieve 7 onto the lower sieve 8 and finally as it falls from the lower sieve 8 onto the clean grain collecting floor 70, cleaning air blasts are directed in opposite directions from below through said sieves and generally transversely across the paths of falling material thus making light particles such as dust, chaff and short straw pieces air borne for discharging these particles rearwardly of the cleaning device.

Incompletely threshed ears or so-called tailings are too large in size to fall through the apertures in the chaffer sieve 7 and therefore are conveyed over the chaffer sieve 7 to the sieve extension 11 of which the mesh is substantially larger, thus permitting said tailings to fall through and to be collected on the tailings collecting floor or bottom wall 66 of the lower shaker shoe 65. Tailings are directed to the tailings trough 13 from whereon they are conveyed either back to the threshing mechanism or to a separate tailings rethresher for rethreshing. Clean grain is directed to the clean grain auger trough 14 and from thereon to the grain tank for temporary storage therein.

When the machine is operated on a sideward incline, the machine chassis 12 assumes an inclined position relative to the vertical and accordingly the cleaning device assumes an inclined position relative to the horizontal. This deviation from the horizontal position transversely of the machine is detected by the inclination detector 91 whereby a signal is supplied to one of the relays 92 which in turn energizes the actuator 33. Thereby the entire cleaning device comprising the grain pan 6, both sieves 7 and 8 and the cleaning fan 9 are pivoted about the fore-and-aft extending pivot axis 53 in a direction towards the level position. As soon as this level position is reached, the signal produced by the inclination detector 91 is interrupted and thus the actuator 33 is de-energized.

At all times during the leveling operation of the subframe 32 with the cleaning device thereon relative to the combine chassis 12, the sealing strips 64 at the upper edges of the cleaning device remain in sealing contact with the curved inner surfaces 24 of the chassis 12 whereby at these locations grain losses are positively avoided and yet neither the oscillatory movement of the grain pan 6 and the upper sieve 7, nor the leveling operation of the cleaning device are hampered. Furthermore, at the transition area between the angularly adjustable cleaning device and the stationary tailings and clean grain collecting troughs 13, 14, equally grain losses are positively avoided by the provision of sealings therebetween. Also the leveling of the cleaning device has no effect on the drive thereof as the angular adjustment of the cleaning device is taken up entirely by the telescoping universal joint shaft 90.

Furthermore, as the upper side edges of the cleaning device are at about the level of the pivot axis 53 of the cleaning device, a given angular adjustment of said cleaning device about said pivot axis results only in a minimal transverse displacement of said upper side edges toward the center, as seen in vertical projection. This also means on the one hand that the curved inner surfaces 24 of the combine chassis 12 do not deviate substantially from straight upright wall sections and on the other hand that for a given maximum angular adjustment of the cleaning device, the total width of the cleaning device should only minimally exceed the total width of the threshing and separating device to ensure at all times a full overlap between said threshing and separating device and said cleaning device.

Finally and most importantly, the operation of the combine harvester on side hills has practically no effect on the cleaning performance of the cleaning device for a number of reasons. Indeed, the ideal relationship of the grain pan 6, the cleaning fan outlet duct 10 and both sieves 7 and 8 relative to each other is maintained at all times during operation and thus, the cleaning characteristics, which depend from said relationship remain unvaried. More particularly for cleaning characteristics of the cleaning device do not vary transversely of the cleaning device.

Another reason is to be seen in the fact that at all times the grain pan 6 is positioned generally horizontally which is the ideal position for accomplishing the pre-classification of grain, chaff and straw particles in the manner as described above.

Also, as the grain pan and cleaning sieves are kept horizontal there is no tendency for crop materials to accumulate to one side of the cleaning device during its movement over the various components thereof as well as during its transfer from one component to another. Consequently an even crop distribution and thus also an even loading transversely of the cleaning device is maintained. Also, the wind pattern transversely of the cleaning device remains unaffected and consequently the cleaning device can continuously be operated at maximum capacity without any unacceptable grain losses occurring as a result of the hillside operation. The former characteristics are particularly advantageous in combination with so-called rotary threshing and separating components as combines of the rotary type usually have a higher capacity on the one hand and cause a greater sieve loading due to the increased production of short straw on the other hand.

Varying sieve loading lengthwise of the machine and the tendency for material to accumulate on the sieves as the machine is operating downhill and increased risks for sieve losses as the machine is operating uphill usually should not create any insuperable problems as fan speed adjustment can cope therewith.

Thus, with the present invention, a combine harvester is provided which is capable of operating on sloping ground at full capacity without causing any excessive sieve grain losses resulting in one way or another from said operation on inclined ground. The solution given is relatively simple in design with a minimum number of additional components and as a result thereof the cost increase is kept within acceptable limits.

While the preferred structure and the principles of the present invention have been incorporated as shown and described above, it is to be understood that the invention is not to be limited to the precise details herein illustrated and described since the same may be carried out in other ways falling within the scope of the invention as illustrated and described.

Having thus described the invention what is claimed is:

1. In a combine harvester:
   threshing, separating and cleaning devices operably mounted in said harvester, said cleaning device having a grain pan, a cleaning sieve and a cleaning fan; and
   means for leveling said cleaning device to a transverse generally horizontal position in response to said harvester being inclined relative to the horizontal, said means for leveling including said grain pan, sieve and cleaning fan of said cleaning device being pivotable in unison about an axis extending in the direction of travel of said harvester, said cleaning device being connected to a subframe pivotally mounted in said harvester.

2. The combine harvester according to claim 1 wherein the subframe is generally rectangular in shape.

3. The combine harvester according to claim 2 wherein the subframe further has a bottom portion connecting the front and the rear end and the two opposing sides so that the grain pan and at least one cleaning sieve are positioned above the bottom portion.

4. The combine harvester according to claim 3 wherein the grain pan and cleaning sieve further include sealing means to prevent loss of crop material.

5. The combine harvester according to claim 1 wherein the grain pan and at least one cleaning sieve are mounted for reciprocating movement relative to the subframe.

6. The combine harvester of claim 1 wherein the subframe further supports at its front end a generally U-shaped structure, the U-shaped structure having a front portion and sidewalls.

7. The combine harvester according to claim 1 wherein the cleaning fan is fixedly mounted to the subframe and extends therefrom at a level generally therebelow.

8. The combine harvester according to claim 7 wherein at least one cleaning sieve is positioned at a level below the level of the grain pan such that the cleaning fan, the grain pan and the cleaning sieve maintain a generally constant angular relationship thereamong during operation.

9. The combine harvester according to claim 1 wherein the subframe is supported and guided in pivotal movement by a plurality of guide rolls and arcuate guide means operably connected between said subframe and said harvester.

10. In a combine harvester of the type including threshing, separating and cleaning devices, the cleaning devices having a grain pan, a cleaning sieve and a cleaning fan, the improvement comprising:

means for leveling the cleaning device to a transverse generally horizontal position in response to said harvester being inclined relative to the horizontal, said means for leveling including said grain pan, sieve and cleaning fan of said cleaning device being pivotable in unison about an axis extending in the direction of travel of said harvester, said cleaning device being connected to a subframe pivotally mounted in said harvester;

means connected in the harvester for detecting when the harvester is inclined from a level position; and means connected to the detecting means to be actuated for uniformly pivoting said cleaning device.

* * * * *